US006692653B2

(12) United States Patent
Lee et al.

(10) Patent No.: US 6,692,653 B2
(45) Date of Patent: Feb. 17, 2004

(54) REFRIGERANT COMPOSITION

(75) Inventors: Byung-Gwon Lee, Seoul (KR); Jong-Sung Lim, Seoul (KR); Hong-Gon Kim, Seoul (KR); Chang-Nyeon Kim, Seoul (KR)

(73) Assignee: Korea Institute of Science and Technology (KR)

( * ) Notice: Subject to any disclaimer, the term of this patent is extended or adjusted under 35 U.S.C. 154(b) by 69 days.

(21) Appl. No.: 10/076,725

(22) Filed: Feb. 13, 2002

(65) Prior Publication Data

US 2003/0001132 A1 Jan. 2, 2003

(30) Foreign Application Priority Data

Feb. 16, 2001 (KR) .......................................... 2001-7884

(51) Int. Cl.$^7$ ................................................ C09K 5/04
(52) U.S. Cl. ....................................................... 252/67
(58) Field of Search ..................................... 252/67, 68

(56) References Cited

U.S. PATENT DOCUMENTS

| 5,080,823 | A | | 1/1992 | Arnaud et al. |
| 5,211,867 | A | | 5/1993 | Shankland et al. |
| 5,234,613 | A | | 8/1993 | Shiflett |
| 5,236,611 | A | | 8/1993 | Shiflett |
| 5,290,466 | A | | 3/1994 | Shiflett |
| 5,340,490 | A | | 8/1994 | Decaire et al. |
| 5,403,504 | A | | 4/1995 | Bivens et al. |
| 5,417,871 | A | * | 5/1995 | Minor et al. ................. 252/67 |
| 5,429,740 | A | | 7/1995 | Van Der Herberg |
| 5,538,660 | A | | 7/1996 | Macaudiere |
| 5,622,644 | A | | 4/1997 | Stevenson et al. |
| 5,643,492 | A | | 7/1997 | Shiflett |

FOREIGN PATENT DOCUMENTS

| EP | 0693541 | | 1/1996 |
| JP | 03170583 | | 7/1991 |
| JP | 03170584 | | 7/1991 |
| JP | 03170585 | | 7/1991 |
| JP | 03170588 | | 7/1991 |
| JP | 03170589 | | 7/1991 |
| JP | 03170590 | | 7/1991 |
| JP | 03170591 | | 7/1991 |
| JP | 03170593 | | 7/1991 |
| JP | 03170594 | | 7/1991 |
| JP | 03172384 | | 7/1991 |
| JP | 03172386 | | 7/1991 |
| JP | 04154887 | | 5/1992 |
| JP | 04222893 | | 8/1992 |
| JP | 05117643 | | 5/1993 |
| JP | 05117645 | | 5/1993 |
| JP | 06065561 | | 3/1994 |
| JP | 06128872 | | 5/1994 |
| JP | 06220433 | | 8/1994 |
| JP | 07173462 | | 7/1995 |
| JP | 08127767 | | 5/1996 |
| JP | 08151569 | | 6/1996 |
| JP | 08176537 | | 7/1996 |
| JP | 09025480 | | 1/1997 |
| JP | 09059611 | | 3/1997 |
| JP | 09208941 | | 8/1997 |
| JP | 09221664 | | 8/1997 |
| WO | WO 94/00529 | * | 1/1994 |
| WO | 9421745 | | 9/1994 |

* cited by examiner

Primary Examiner—John Hardee
(74) Attorney, Agent, or Firm—Ostrolenk, Faber, Gerb & Soffen, LLP

(57) ABSTRACT

The present invention relates to a refrigerant composition of four-constituent system, comprising: (a) a first constituent of difluoromethane, (b) a second constituent of 1,1,1,2,3,3,3-heptafluoropropane, (c) a third constituent selected from the group consisting of 1,1,1,2-tetrafluoroethane and 1,1-difluoroethane and (d) a for the constituent selected from the group consisting of isobutane, 1,1,1,2,3,3,-hexafluoropropane and butane, useful as a substitute for chlorodifluoromethane (HCFC-22).

2 Claims, No Drawings

REFRIGERANT COMPOSITION

BACKGROUND OF THE INVENTION

1. Field of the Invention

The present invention relates to a refrigerant composition useful as a refrigerant for a refrigerator, an air-conditioner, etc.

2. Description of the Background Art

Chlorofluorocarbon (hereinafter referred to as "CFC") compound, which were used as a refrigerant, have been restricted in production and use according to the Montreal Protocol because they have been found as a main factor in contributing to the destruction of the ozone layer in a stratosphere. In developed countries, the use of such CFC compounds have already been banned since 1996. It is also known that hydrochlorofluorocarbon (hereinafter referred to as "HCFC") compounds such as HCFC-22 have considerable effects in causing damage to the ozone layer even though this effect is less severe than that of CFC compounds. For this reason, a restriction has been made to gradually reduce the use of HCFC compounds. A plan has also been made to ban the use of HCFC about 2030. In preparation of the full-scale restriction to the HCFC-22, many countries around the world are making a heavy investment to develop a refrigerant that can substitute HCFC-22.

However, it is well known that it is difficult to obtain a performance coefficient similar to that of HCFC-22 with a single material. One of methods to solve the above-mentioned problem would be to use of a mixed refrigerant having similar physical properties to that of HCFC-22.

Namely, a mixed refrigerant has advantages in that by controlling a composition of the mixed refrigerant, almost the same vapor pressure as the conventional refrigerant can be achieved, the same lubricant can be used, and the compressor needs not to be replaced. For this reason, several different types of mixed refrigerants have been developed as a substitute for HCFC-22 for the past several years.

Representative examples of a refrigerant composition developed as a substitute for HCFC-22 are HFC-407C and HFC-410A proposed by the American Society of Heating, Refrigerating and Air-conditioning Engineers (ASHRAE). HFC-407C is a refrigerant composition of HFC-32/125/134a in a ration of 23/25/52 based on weight percent. Meanwhile, HFC-410A is a refrigerant composition of HFC-32/125 in a ratio of 50/50 based on weight percent.

In addition, U.S. Pat. No. 5,080,823 discloses a refrigerant composition of HFC-143a/propane, U.S. Pat. No. 5,211,867: HFC-125/143a, U.S. Pat. No. 5,234,613: HFC-32/propane, U.S. Pat. No. 5,236,611: PFC-218/HFC-143a, U.S. Pat. No. 5,290,466: HFC-32/134a/134, U.S. Pat. No. 5,340,490: HFC-23/$CO_2$ and HFC-23/116/$CO_2$, U.S. Pat. No. 5,403,504: HFC-125/32, U.S. Pat. No. 5,429,740: HFC-23/134a U.S. Pat. No. 5,538,660: HFC-32/HFC-134a/FC-41 and HFC-32/HFC-134a/PFC-218, and U.S. Pat. No. 5,643,492: HFC-32/125/134a.

Also, Japanese Patent Laid-open Publication No. 172386/1991 discloses a refrigerant composition of HFC-32/125/143a, Japanese Patent Laid-open Publication No. 170594/1991: HFC-23/125/134a, Japanese Patent Laid-open Publication No. 170593/1991: HFC-23/125/32, Japanese Patent Laid-open Publication No. 170591/1991: HFC-23/143a/134a, Japanese Patent Laid-open Publication No. 170590/1991: HFC-125/134a/32, Japanese Patent Laid-open Publication No. 170589/1991: HFC-23/143a/152a, Japanese Patent Laid-open Publication No. 170588/1991: HFC-125/143a/134a, Japanese Patent Laid-open Publication No. 170585/1991: HFC-32/125/134a, Japanese Patent Laid-open Publication No. 170584/1991: HFC-23/134a/152a, Japanese Patent Laid-open Publication No. 170583/1991: HFC-1251143a/32, Japanese Patent Laid-open Publication No. 222893/1992: HFC-32/125, Japanese Patent Laid-open Publication No. 154887/1992: HFC-134/152a, Japanese Patent Laid-open Publication No. 117645/1993: HFC-23/134a/propane, Japanese Patent Laid-open Publication No. 117643/1993: HFC-125/134a/propane, Japanese Patent Laid-open Publication No. 65561/1994: HFC-23/152a/PFC-218, Japanese Patent Laid-open Publication No. 128872/1994: HFC-32/PFC-218, Japanese Patent Laid-open Publication No. 220433/1994: HFC-32/125/RC-318, Japanese Patent Laid-open Publication No. 173462/1995: HFC-143a/125/134a/heptane, Japanese Patent Laid-open Publication No. 176537/1996: PFC-218/RC-270/HFC-152a, Japanese Patent Laid-open Publication No. 151569/1996: propane/RC-270/HFC-134a, Japanese Patent Laid-open Publication No. 127767/1996: HFC-32/134a/RC-318, Japanese Patent Laid-open Publication No. 25480/1997: HFC-32/134a/125/isobutane, Japanese Patent Laid-open Publication No. 59611/1997: HFC-134a/isobutane, Japanese Patent Laid-open Publication No. 208941/1997: HFC-32/152a/125/RC-270, and Japanese Patent Laid-open Publication No. 221664/1997: HFC-125/143a/134a/RC-270.

Also, Korean Patent Laid-open Publication No. 91-9902 discloses a refrigerant composition of HFC-23/32/152a, HFC-23/125/152a, HFC-32/143a/152a, HFC-125/143a/152a, HFC-32/125/125a and HFC-23/143a/152a, Korean Patent Laid-open Publication No. 91-9903: HFC-23/32/134, HFC-23/32/134a, HFC-23/125/134, HFC-32/125/134, HFC-23/143a/134a, HFC-125/143a/134a and HFC-125/143a/134, Korean Patent Laid-open Publication No. 96-4485: HFC-32/23/134a, Korean Patent Laid-open Publication No. 96-701168: HFC-227ea/HFC-152a, and Korean Patent Laid-open Publication No. 97-704853: HFC-134a/HCFC-124/butane.

Such various types of mixed refrigerants as mentioned above are being applied to a refrigerator, an air-conditioner, etc.

SUMMARY OF THE INVENTION

Therefore, an object of the present invention is to provide a refrigerant composition which has a novel composition, exhibits a similar performance to that of HCFC-22, has no possibility of damaging the ozone layer, and accordingly can be used as a substitute for HCFC-22.

DETAILED DESCRIPTION OF THE PREFERRED EMBODIMENTS

To achieve the above and other objects of the present invention, as embodied and broadly described herein, there is provided a refrigerant composition of four-constituent system, comprising: (a) a first constituent of difluoromethane (hereinafter referred to as "HFC-32"), (b) a second constituent of 1,1,1,2,3,3,3-heptafluoropropane (hereinafter referred to as "HFC-227ea"), (c) a third constituent selected from the group consisting of 1,1,1,2-tetrafluoroethane (hereinafter referred to as "HFC-134a") and 1,1-difluoroethane (hereinafter referred to as "HFC-152a"), and (d) a forth constituent selected from the group consisting of isobutane (hereinafter referred to as "R-600a"), 1,1,1,2,3,3,-hexafluoropropane (hereinafter referred to as "HFC-236ea") and butane (hereinafter referred to as "R-600").

That is, the refrigerant composition of the present invention comprises (a) a first constituent of HFC-32, (b) a second constituent of HFC-227ea as a second constituent, (c) a third constituent selected from the group consisting of HFC-134a and HFC-152a, and (d) a forth constituent selected from the group consisting of R-600a, HFC-236ea and R-600.

First, the composition of a refrigerant composition of the present invention containing HFC-32, HFC-227ea, HFC-134a, and one constituent selected from the group consisting of R-600a, HFC-236ea and R-600 will now be described.

In a refrigerant composition according to one embodiment of the present invention, the contents of HFC-32, HFC-227ea, HFC-134a and R-600a are preferably in the range of 50–60 wt. %, 10–20 wt. %, 10–30 wt. % and 5–15 wt. %, respectively, to the total weight of the refrigerant composition. And more preferably, the contents of HFC-32, HFC-227ea, HFC-134a and R-600a are in the range of 53–57 wt. %, 13–17 wt. %, 15–25 wt. % and 8–12 wt. %, respectively.

In a refrigerant composition according to another embodiment of the present invention, the contents of HFC-32, HFC-227ea, HFC-134a and HFC-236ea are preferably in the range of 50–70 wt. %, 10–20 wt. %, 10–30 wt. % and 5–15 wt. %, respectively, to the total weight of the refrigerant composition. And more preferably, the contents of HFC-32, HFC-227ea, HFC-134a and HFC-236ea are in the range of 55–65 wt. %, 13–17 wt. %, 15–25 wt. % and 7–12 wt. %, respectively.

In a refrigerant composition according to another embodiment of the present invention, the contents of HFC-32, HFC-227ea, HFC-134a and R-600 are preferably in the range of 50–70 wt. %, 10–20 wt. %, 10–30 wt. % and 5–12 wt. %, respectively, to the total weight of the refrigerant composition. And more preferably, the contents of HFC-32, HFC-227ea, HFC-134a and R-600 are in the range of 55–65 wt. %, 13–17 wt. %, 15–25 wt. % and 7–10 wt. %, respectively.

Next, the composition of a refrigerant composition comprising HFC-32, HFC-227ea, HFC-152a, and one constituent selected from the group consisting of R-600a, HFC-236ea and R-600 will now be described.

In a refrigerant composition according to one embodiment of the present invention, the contents of HFC-32, HFC-227ea, HFC-152a and R-600a are preferably in the range of 40–70 wt. %, 10–20 wt. %, 10–40 wt. % and 5–15 wt. %, respectively, to the total weight of the refrigerant composition. And more preferably, the contents of HFC-32, HFC-227ea, HFC-152a and R-600a are in the range of 50–60 wt. %, 13–17 wt. %, 20–30 wt. % and 7–12 wt. %, respectively.

In a refrigerant composition according to another embodiment of the present invention, the contents of HFC-32, HFC-227ea, HFC-152a and HFC-236ea are preferably in the range of 50–70 wt. %, 10–20 wt. %, 10–30 wt. % and 5–15 wt. %, respectively, to the total weight of the refrigerant composition. And more preferably, the contents of HFC-32, HFC-227ea, HFC-152a and HFC-236ea are in the range of 55–65 wt. %, 13–17 wt. %, 15–25 wt. % and 7–12 wt. %, respectively.

In a refrigerant composition according to another embodiment of the present invention, the contents of HFC-32, HFC-227ea, HFC-152a and R-600 are preferably in the range of 40–70 wt. %, 10–20 wt. %, 10–40 wt. % and 5–12 wt. %, respectively, to the total weight of the refrigerant composition. And more preferably, contents of HFC-32, HFC-227ea, HFC-152a and R-600 are in the range of 50–60 wt. %, 13–17 wt. %, 20–30 wt. % and 7–10 wt. %, respectively.

The refrigerant composition of the present invention as described above exhibits the similar performance to that of the conventional HCFC-22 (see Table 10). Further, because there is no risk to damage the ozone layer, there is no concern to be restricted in its use in the future, and thereby, it can be used as a substitute for HCFC-22.

EXAMPLE

The present invention will now be described in more detail in the following examples. However, it is to be understood that these examples are merely illustrative and it is not intended to limit the scope of the present invention to these examples.

1. Preparation of a Refrigerant Composition

Examples 1–6

Composition of HFC-32/HFC-134a/HFC-227ea/R-600a

Refrigerant compositions having the composition shown in Table 1 were prepared by mixing the constituents according to the typical method.

TABLE 1

| Example No. | Mixed refrigerant composition (wt. %) | | | |
|---|---|---|---|---|
| | HFC-32 | HFC-134a | HFC-227ea | R-600a |
| 1 | 50 | 20 | 20 | 10 |
| 2 | 50 | 30 | 10 | 10 |
| 3 | 60 | 10 | 20 | 10 |
| 4 | 60 | 20 | 10 | 10 |
| 5 | 50 | 25 | 20 | 5 |
| 6 | 55 | 15 | 15 | 15 |

Examples 7–12.

Composition of HFC-32/HFC-134a/HFC-227ea/HFC-236ea

Refrigerant compositions having the composition shown in Table 2 were prepared by mixing the constituents according to the typical method.

TABLE 2

| Example No. | Mixed refrigerant composition (wt. %) | | | |
|---|---|---|---|---|
| | HFC-32 | HFC-134a | HFC-227ea | HFC-236ea |
| 7 | 50 | 30 | 10 | 10 |
| 8 | 60 | 10 | 20 | 10 |
| 9 | 60 | 20 | 10 | 10 |
| 10 | 70 | 10 | 10 | 10 |
| 11 | 60 | 20 | 15 | 5 |
| 12 | 60 | 15 | 10 | 15 |

Examples 13–18.

Composition of HFC-32/HFC-134a/HFC-227ea/R-600

Refrigerant compositions having the composition shown in Table 3 were prepared by mixing the constituents according to the typical method.

TABLE 3

| Example No. | Mixed refrigerant composition (wt. %) | | | |
|---|---|---|---|---|
| | HFC-32 | HFC-134a | HFC-227ea | R-600 |
| 13 | 50 | 30 | 10 | 10 |
| 14 | 60 | 10 | 20 | 10 |
| 15 | 60 | 20 | 10 | 10 |

TABLE 3-continued

| Example No. | Mixed refrigerant composition (wt. %) | | | |
|---|---|---|---|---|
| | HFC-32 | HFC-134a | HFC-227ea | R-600 |
| 16 | 70 | 10 | 10 | 10 |
| 17 | 60 | 20 | 15 | 5 |
| 18 | 62 | 16 | 10 | 12 |

Examples 19–26.

Composition of HFC-32/HFC-152a/HFC-227ea/R-600a

Refrigerant compositions having the composition shown in Table 4 were prepared by mixing the constituents according to the typical method.

TABLE 4

| Example No. | Mixed refrigerant composition (wt. %) | | | |
|---|---|---|---|---|
| | HFC-32 | HFC-152a | HFC-227ea | R-600a |
| 19 | 40 | 40 | 10 | 10 |
| 20 | 50 | 20 | 20 | 10 |
| 21 | 50 | 30 | 10 | 10 |
| 22 | 60 | 10 | 20 | 10 |
| 23 | 60 | 20 | 10 | 10 |
| 24 | 70 | 10 | 10 | 10 |
| 25 | 50 | 30 | 15 | 5 |
| 26 | 60 | 15 | 10 | 15 |

Examples 27–33.

Composition of HFC-32/HFC-152a/HFC-227ea/HFC-236ea

Refrigerant compositions having the composition shown in Table 5 were prepared by mixing the constituents according to the typical method.

TABLE 5

| Example No. | Mixed refrigerant composition (wt. %) | | | |
|---|---|---|---|---|
| | HFC-32 | HFC-152a | HFC-227ea | HFC-236ea |
| 27 | 50 | 20 | 20 | 10 |
| 28 | 50 | 30 | 10 | 10 |
| 29 | 60 | 10 | 20 | 10 |
| 30 | 60 | 20 | 10 | 10 |
| 31 | 70 | 10 | 10 | 10 |
| 32 | 55 | 25 | 15 | 5 |
| 33 | 60 | 15 | 10 | 15 |

Examples 34–40.

Composition of HFC-32/HFC-152a/HFC-227ea/R-600

Refrigerant compositions having the composition shown in Table 6 were prepared by mixing the constituents according to the typical method.

TABLE 6

| Example No. | Mixed refrigerant composition (wt. %) | | | |
|---|---|---|---|---|
| | HFC-32 | HFC-152a | HFC-227ea | R-600 |
| 34 | 40 | 40 | 10 | 10 |
| 35 | 50 | 30 | 10 | 10 |
| 36 | 60 | 10 | 20 | 10 |
| 37 | 60 | 20 | 10 | 10 |
| 38 | 70 | 10 | 10 | 10 |
| 39 | 55 | 25 | 15 | 5 |
| 40 | 62 | 16 | 10 | 12 |

Comparative Examples 1–6

Refrigerant compositions having the composition shown in Table 7 were prepared by mixing the constituents according to the typical method. These mixtures contain the same constituents as in the Examples 1–18 but with different contents of some constituents.

TABLE 7

| Comparative Example No. | Mixed refrigerant composition (wt. %) | | | | | |
|---|---|---|---|---|---|---|
| | HFC-32 | HFC-134a | HFC-227a | R-600a | HFC-236a | R-600 |
| 1 | 20 | 30 | 20 | 30 | — | — |
| 2 | 50 | 10 | 30 | 10 | — | — |
| 3 | 20 | 30 | 20 | — | 30 | — |
| 4 | 50 | 10 | 30 | — | 10 | — |
| 5 | 20 | 30 | 20 | — | — | 30 |
| 6 | 50 | 10 | 30 | — | — | 10 |

Comparative Examples 7–12

Refrigerant compositions having the composition shown in Table 8 were prepared by mixing the constituents according to the typical method. These mixtures contain the same constituents as in the Examples 19–40 but with different contents of some constituents.

TABLE 8

| Comparative Example No. | Mixed refrigerant composition (wt. %) | | | | | |
|---|---|---|---|---|---|---|
| | HFC-32 | HFC-152a | HFC-227a | R-600a | HFC-236a | R-600 |
| 7 | 20 | 30 | 20 | 30 | — | — |
| 8 | 50 | 10 | 30 | 10 | — | — |
| 9 | 20 | 30 | 20 | — | 30 | — |
| 10 | 50 | 10 | 30 | — | 10 | — |
| 11 | 20 | 30 | 20 | — | — | 30 |
| 12 | 50 | 10 | 30 | — | — | 10 |

Comparative Examples 13–15

Conventional refrigerants of HCFC-22, HFC-407C and HFC-410A having the composition as shown in Table 9 were respectively prepared by mixing the constituents according to the typical method.

TABLE 9

| Comparative Examples No. | Mixed refrigerator composition (wt. %) | | | | Refrigerant |
|---|---|---|---|---|---|
| | HCFC-22 | HFC-32 | HFC-125 | HFC-134a | |
| 13 | 100 | — | — | — | HCFC-22 |
| 14 | — | 23 | 25 | 52 | HFC-407C |
| 15 | — | 50 | 50 | — | HFC-410A |

2. Performance Test of the Refrigerant Composition

The refrigerant compositions prepared as in Examples 1 through 40 and the Comparative Examples 1 through 12 were applied to a refrigeration system which comprises a compressor, a condenser, an expansion valve and an evaporator. And then, main factors for evaluating refrigerant performance such as a coefficient of performance (COP), a volumetric capacity (VC) of the refrigerant, pressure in the condenser ($P_H$) and pressure in the evaporator ($P_L$) were measured under the following conditions:

Refrigeration capacity: 2 kW

Coefficient of Overall Heat Transfer in Evaporator (UA): 0.20 kW/K

Coefficient of Overall Heat Transfer in Condenser (UA): 0.20 kW/K

Degree of Subcooling in Condenser: 5° C.

Degree of Superheating in Evaporator: 5° C.

Efficiency of Compressor: 0.8

Temperature of Secondary Fluid at Inlet of Condenser: 25° C

Temperature of Secondary Fluid at Outlet of Condenser: 35° C

Temperature of Secondary Fluid at Inlet of Evaporator: 15° C

Temperature of Secondary Fluid at Outlet of Evaporator: 5° C

Table 10 shows the performance test results of the refrigerant compositions of Examples 1–40.

TABLE 10

| Example No. | COP | VC (kJ/m³) | $P_L$ (kPa) | $P_H$ (kPa) |
|---|---|---|---|---|
| 1 | 5.05 | 4429.7 | 635.0 | 1829.1 |
| 2 | 5.11 | 4394.8 | 623.6 | 1788.4 |
| 3 | 5.17 | 4862.6 | 703.1 | 1947.8 |
| 4 | 5.21 | 4800.4 | 686.1 | 1900.6 |
| 5 | 5.10 | 4366.3 | 609.5 | 1776.9 |
| 6 | 4.99 | 4557.0 | 666.7 | 1900.5 |
| 7 | 5.03 | 4001.8 | 535.9 | 1643.5 |
| 8 | 5.11 | 4516.4 | 620.4 | 1817.6 |
| 9 | 5.15 | 4415.7 | 597.8 | 1754.9 |
| 10 | 5.31 | 4839.9 | 661.6 | 1856.0 |
| 11 | 5.21 | 4514.7 | 613.5 | 1775.2 |
| 12 | 5.03 | 4332.2 | 589.0 | 1768.4 |
| 13 | 5.00 | 4093.8 | 569.1 | 1700.6 |
| 14 | 5.00 | 4512.9 | 642.7 | 1866.3 |
| 15 | 5.10 | 4498.0 | 632.1 | 1816.9 |
| 16 | 5.23 | 4908.9 | 696.6 | 1923.1 |
| 17 | 5.22 | 4609.0 | 639.4 | 1817.5 |
| 18 | 4.98 | 4456.5 | 632.3 | 1843.7 |
| 19 | 5.00 | 3532.6 | 478.1 | 1466.0 |
| 20 | 5.03 | 4134.1 | 578.8 | 1706.9 |
| 21 | 5.04 | 3959.8 | 544.6 | 1621.4 |
| 22 | 5.14 | 4678.3 | 668.0 | 1879.2 |
| 23 | 5.13 | 4436.3 | 620.5 | 1776.6 |
| 24 | 5.27 | 4976.2 | 708.0 | 1933.8 |
| 25 | 5.07 | 3911.6 | 528.2 | 1588.0 |
| 26 | 5.07 | 4530.4 | 649.5 | 1843.3 |
| 27 | 5.02 | 3882.8 | 519.0 | 1599.7 |
| 28 | 5.06 | 3717.8 | 488.5 | 1509.3 |
| 29 | 5.12 | 4398.9 | 599.1 | 1761.7 |
| 30 | 5.14 | 4168.3 | 556.5 | 1655.4 |
| 31 | 5.28 | 4680.7 | 635.1 | 1801.1 |
| 32 | 5.13 | 3993.5 | 530.4 | 1595.0 |
| 33 | 5.05 | 4188.0 | 563.4 | 1696.7 |
| 34 | 5.02 | 3430.5 | 459.3 | 1419.0 |
| 35 | 5.05 | 3839.0 | 522.2 | 1569.9 |
| 36 | 5.04 | 4434.2 | 625.6 | 1814.1 |
| 37 | 5.12 | 4290.4 | 593.4 | 1719.8 |
| 38 | 5.24 | 4794.3 | 674.4 | 1870.4 |
| 39 | 5.12 | 4077.1 | 552.4 | 1637.3 |
| 40 | 5.06 | 4353.5 | 609.2 | 1766.9 |

Table 11 shows the performance test results of the refrigerant compositions of Comparative Examples 1–12.

TABLE 11

| Comparative Example No. | COP | VC (kJ/m³) | $P_L$ (kPa) | $P_H$ (kPa) |
|---|---|---|---|---|
| 1 | 4.26 | 2697.9 | 390.8 | 1389.2 |
| 2 | 4.94 | 4416.4 | 639.8 | 1870.2 |
| 3 | 4.21 | 2337.6 | 300.1 | 1249.6 |
| 4 | 4.86 | 4104.4 | 565.2 | 1759.6 |
| 5 | 3.89 | 2129.4 | 288.5 | 1249.9 |
| 6 | 4.77 | 4085.8 | 582.1 | 1794.5 |
| 7 | 4.52 | 2663.9 | 373.4 | 1271.6 |
| 8 | 4.96 | 4278.1 | 611.5 | 1802.0 |
| 9 | 4.53 | 2397.6 | 305.4 | 1153.5 |
| 10 | 4.92 | 4026.3 | 549.2 | 1701.4 |
| 11 | 4.18 | 2233.6 | 301.4 | 1179.3 |
| 12 | 4.83 | 4031.2 | 569.1 | 1743.7 |

Table 12 shows the performance test results of the refrigerant compositions of Comparative Examples 13–15.

TABLE 12

| Comparative Example No. | COP | VC (kJ/m³) | $P_L$ (kPa) | $P_H$ (kPa) |
|---|---|---|---|---|
| 13 | 4.26 | 2697.9 | 390.8 | 1389.2 |
| 14 | 4.94 | 4416.4 | 639.8 | 1870.2 |
| 15 | 4.21 | 2337.6 | 300.1 | 1249.6 |

As shown in Tables 10 and 12, the performances as indicated in each item of the refrigerant compositions of Examples 1–40 are similar to those of the conventional refrigerants of HCFC-22, HFC-407C and HFC-410A. Accordingly, the refrigerant compositions of Examples 1 through 40 can be used as a substitute for the HCFC-22.

However, the refrigerant compositions of Comparative Examples 1 through 12 exhibit poor performances compared to the refrigerants of Examples 1 through 40 according to the present invention, and therefore, it is discovered that they are inappropriate to use as a substitute for HCFC-22.

What is claimed is:

1. A refrigerant composition, comprising:

(a) 50–70 wt. % of difluoromethane as a first constituent, (b) 10–20 wt. % of 1,1,1,2,3,3,3-heptafluoropropane, as a second constituent, (c) 10–30 wt. % of 1,1,1,2-tetrafluoroethane as a third constituent, and (d) 5–15 wt. % of isobutane as a fourth constituent.

2. The refrigerant composition according to claim 1, wherein the content of the difluoromethane is 50–60 wt. %.

* * * * *